United States Patent [19]

Zimmerman et al.

[11] 4,121,445
[45] Oct. 24, 1978

[54] APPARATUS FOR CONNECTING A COVER TO A CHOCK IN A ROLLING MILL

[75] Inventors: Otto Zimmerman, Musen; Rolf Gerd Irle, Dahlbruch, both of Fed. Rep. of Germany

[73] Assignee: Morgan Construction Company, Worcester, Mass.

[21] Appl. No.: 824,050

[22] Filed: Aug. 12, 1977

[30] Foreign Application Priority Data

Aug. 25, 1976 [DE] Fed. Rep. of Germany ....... 2638241

[51] Int. Cl.² ........................................... B21B 31/08
[52] U.S. Cl. ..................................... 72/237; 72/238; 74/606 R
[58] Field of Search ................. 72/237, 238, 247; 308/207 R; 100/115

[56] References Cited

U.S. PATENT DOCUMENTS

| 2,243,009 | 5/1941 | Kingsbury et al. ............... 72/237 X |
| 3,003,836 | 10/1961 | Hill ................................... 72/237 X |

*Primary Examiner*—Milton S. Mehr
*Attorney, Agent, or Firm*—Thompson, Birch, Gauthier & Samuels

[57] ABSTRACT

An apparatus for connecting a cover to a chock in a rolling mill comprising spaced supports on the chock, an arm extending laterally from the cover into the space between the supports, and a pin extending through communicating openings in the supports and the arm. Certain of the openings are dimensioned in relation to the pin to accommodate axial shifting of the cover between a closed position against the chock and an intermediate position from which the cover is free to pivot about the pin to an open position exposing the bearing end. A disengageable retainer is provided for holding the cover in the closed position.

6 Claims, 3 Drawing Figures

APPARATUS FOR CONNECTING A COVER TO A CHOCK IN A ROLLING MILL

FIELD OF INVENTION

This invention relates generally to rolling mills, and in particular to an apparatus for connecting covers to the chocks containing the roll neck bearings. The invention is particularly suited for, although not limited to, chocks containing so-called oil film bearings.

BACKGROUND OF THE INVENTION

Roll neck bearings of the type referred to above are well known to those skilled in the art, as evidenced by the disclosure in U.S. Pat. No. 3,080,199. Conventionally, the end covers for such bearings have been axially mounted on the chocks and held in place by means of screws, keys, or the like. However, since the bearings are usually quite large in diameter, the covers are extremely heavy, and operating personnel must resort to the use of overhead cranes or other like apparatus when removing the covers prior to changing rolls or performing other routine maintenance. This procedure is very time consuming, particularly where overhead cranes are not readily available when needed. Also, after the covers are removed and placed on the mill floor, they are likely to collect dust and dirt, and they also clutter up the work area, making it more difficult for maintenance personnel to perform their duties.

A general object of the present invention is to provide an improved apparatus for connecting covers to the bearing chocks in a rolling mill which obviates or at least substantially minimizes the problems noted above.

A more specific object of the present invention is the provision of an apparatus for hingedly connecting the covers to the chocks in a manner which permits the covers to be axially retracted from their closed position prior to being swung outwardly to open positions.

A further object of the present invention is to enable operating personnel to open the covers without having to resort to overhead cranes or other like lifting mechanisms, with the covers remaining connected to the chocks in their open position.

SUMMARY OF THE INVENTION

According to the present invention, a roll neck bearing is contained in a chock, with a cover axially received on the chock in a closed position overlying the bearing end. The cover is attached to the chock by a hinge assembly which allows the cover to be axially retracted to an intermediate position and then swung to an open position at which the bearing end is fully exposed and the cover remains attached to the chock. The hinge assembly preferably includes spaced supports on the chock, an arm extending laterally from the cover into the space between said supports, and a pin extending through communicating openings in both the chock supports and the cover arm. The openings are dimensioned in relation to the pin to accommodate axial shifting of the cover between its closed position against the chock and an intermediate position from which the cover is then free to pivot to an open position exposing the bearing end. A disengageable retainer is employed to hold the cover in its closed position.

Preferably, the disengageable retainer includes a key removably positioned between the pin and the interior wall of an elongated opening in the aforesaid cover arm. In the preferred embodiment which will hereinafter be described in greater detail, the key is wedge-shaped with non-parallel surfaces, one of which is engageable with a flat surface of the pin and the other of which is engageable with the interior wall of the elongated opening in the cover arm. The wedging action of the key operates to force the cover into its closed position against the chock.

Preferably, the cover includes a cylindrical outer section surrounding an inner cylindrical section on the chock, with a seal interposed therebetween. The aforesaid axial shifting of the cover between its closed position and the intermediate position is sufficient to axially separate these cylindrical sections, thereby providing the clearance needed to swing the cover about the pivot pin to the open position.

DETAILED DESCRIPTION OF PREFERRED EMBODIMENT

Figure 1:
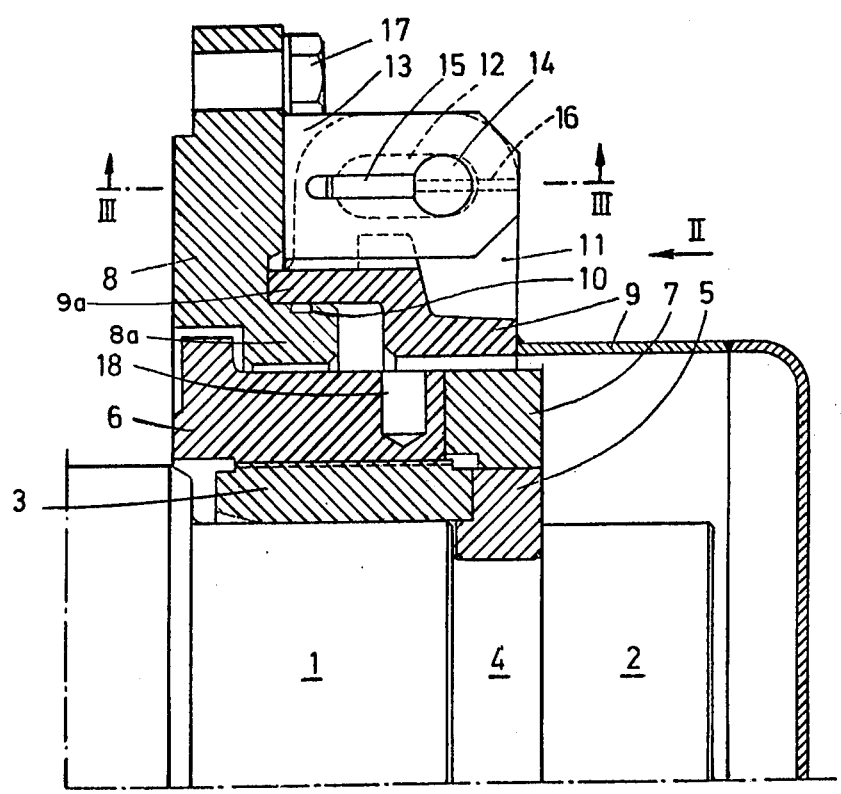
FIG. 1 is a partial horizontal section taken through a rolling mill roll neck bearing and its associated chock end cover showing a preferred embodiment of an apparatus for connecting the cover to the chock.
Figure 2:
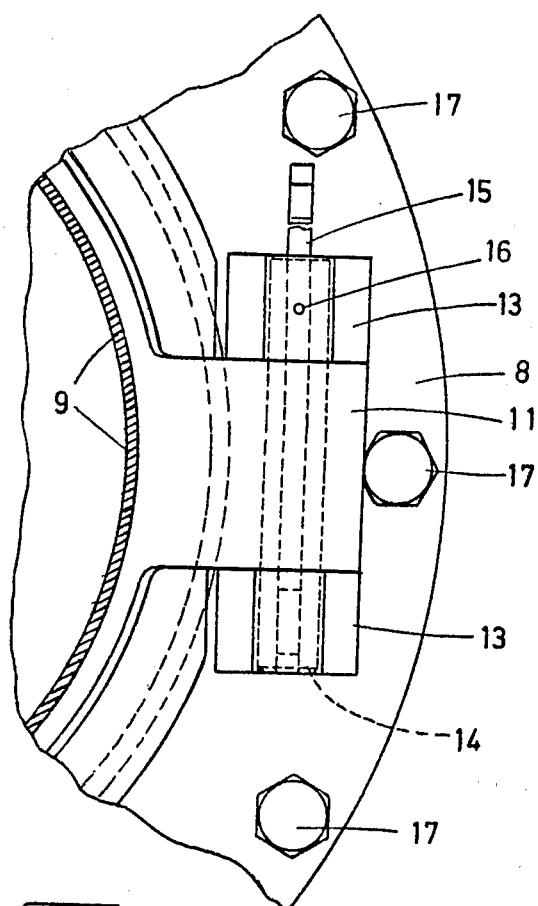
FIG. 2 is an end view of the components shown in FIG. 1.

Referring now to the drawings, there is shown at 1 and 2 cylindrical sections of a roll end separated by a groove 4. An exteriorily threaded ring 3 is mounted on the cylindrical section 1. A locking ring 5 is located in groove 4 to serve as a stop for the ring 3. A nut 6 is threaded onto the ring 3 and serves as the means for retaining bearing components (not shown) on the roll neck.

The nut 6 is locked in place by locking element 7. A bore 18 is provided to receive an appropriate tool employed to remove the nut 6.

The roll neck bearing is contained in a bearing chock, a portion of which (the chock end plate) is shown at 8. An end cover 9 is axially received on the chock 8 and cooperates therewith to enclose the roll end and the bearing, including retainer elements 3–7. Preferably, the chock includes a cylindrical inner section 8a onto which is axially inserted a cylindrical outer section 9a of the cover 9. A sealing ring 10 is preferably interposed between the sections 8a, 9a, and the end of cover section 9a is firmly seated against the chock 8 when the cover is in its closed position as shown in FIG. 1.

Figure 3:
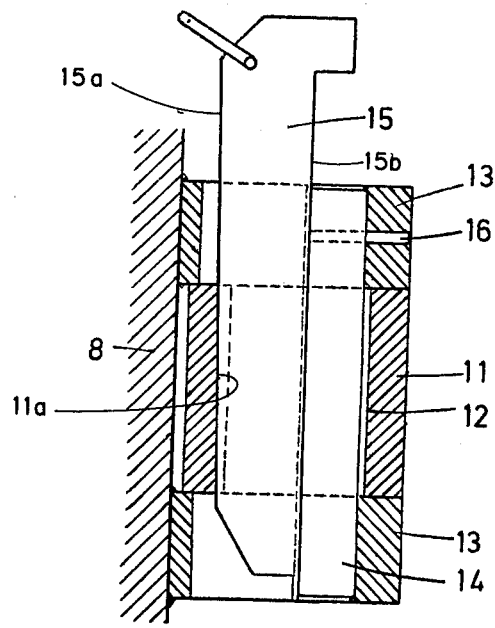
FIG. 3 is a sectional view taken along lines 3—3 of FIG. 1.

An arm 11 extends laterally from the cover 9 into a space provided between a pair of supports 13 fixed to the chock 8. The spaced supports 13 and the arm 11 are provided with communicating openings having a pin 14 extending therethrough. Preferably, the pin is fixed in place by means of a retainer 16. As is best shown in FIGS. 1 and 3, the opening 12 in arm 11 is elongated in a direction parallel to the bearing axis to thus accommodate axial shifting of the cover between the closed position shown in FIG. 1 and an intermediate position at which the cylindrical sections 8a, 9a are axially separated. This axial separation provides the clearance needed to then swing the cover 9 about pin 14 to a fully open position exposing the bearing end. When thus opened, the cover remains pivotally attached to the chock, and movement of the cover from the closed position to the fully opened position can be accomplished by operating personnel without the need of auxiliary lifting equipment. This is due to the fact that the weight of the cover is continually supported by the hinge components 11, 13 and 14.

The cover is held in its closed position by means of a disengageable retainer which in the embodiment herein chosen for purposes of disclosure, comprises a key 15 removably positioned in the opening 12 between the pin 14 and the inner wall 11a of the opening.

Preferably, the key is wedge-shaped with non-parallel surfaces 15a, 15b, one of which is engageable with a flat surface on the pin 14 and the other of which engages the inner wall 11a of the opening 12 in the arm 11. By driving the key 15 downwardly, the cover 9 is urged axially towards the chock 8 into its closed position shown in FIG. 1.

Although not shown, it will be understood that the opposite side of the cover is secured to the chock 8 by any convenient detachable closure mechanism.

We claim:

1. In a rolling mill having a roll neck bearing contained in a chock, with a cover axially received on the chock in a closed position overlying the roll end and the bearing end, apparatus for connecting the cover to the chock, comprising: spaced supports on the chock; an arm on the cover extending between said supports; a pin extending through communicating openings in said supports and said arm, the said openings being dimensioned in relation to said pin to accommodate axial shifting of the cover between said closed position and an intermediate position from which the cover is free to pivot about said pin to an open position exposing the bearing end; and, disengageable retainer means for holding the cover in the closed position.

2. The apparatus of claim 1 wherein said disengageable retainer means is comprised of a key removably positioned between said pin and the interior wall of an elongated opening in said arm.

3. The apparatus of claim 2 wherein said key is wedge-shaped with non-parallel surfaces, one of which is engageable with a flat surface on said pin.

4. The apparatus of claim 1 wherein the cover includes an outer section surrounding an inner section on the chock, with a seal interposed between said sections, the aforesaid shifting of the cover from said closed position to said intermediate position being sufficient to axially separate said sections.

5. The apparatus of claim 3 wherein the wedging action of said key serves to force the cover against the chock.

6. The apparatus of claim 1 further comprising retainer means for fixing said pin relative to one of said supports.

* * * * *